(12) United States Patent
Seki

(10) Patent No.: US 8,562,139 B2
(45) Date of Patent: Oct. 22, 2013

(54) IMAGE DISPLAY APPARATUS

(75) Inventor: Hideya Seki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 1280 days.

(21) Appl. No.: 11/879,506

(22) Filed: Jul. 18, 2007

(65) Prior Publication Data

US 2008/0018808 A1    Jan. 24, 2008

(30) Foreign Application Priority Data

Jul. 21, 2006  (JP) .................................. 2006-199262

(51) Int. Cl.
  G03B 21/00   (2006.01)
  G03B 21/20   (2006.01)
  G03B 21/26   (2006.01)
  G02F 1/00    (2006.01)
  G09G 5/00    (2006.01)

(52) U.S. Cl.
  USPC ................. 353/31; 353/85; 353/94; 353/122; 348/751; 348/752; 345/613

(58) Field of Classification Search
  USPC ............ 353/20, 31, 38, 85, 94, 122, 98, 102; 348/751–752, 762, 767; 331/155, 158; 345/613, 694, 696
  See application file for complete search history.

(56) References Cited

U.S. PATENT DOCUMENTS

| | | | |
|---|---|---|---|
| 6,094,181 A * | 7/2000 | Hildebrand et al. | 345/8 |
| 6,445,487 B1 | 9/2002 | Roddy et al. | |
| 7,125,121 B2 * | 10/2006 | Miyagaki et al. | 353/31 |
| 7,267,442 B2 * | 9/2007 | Childers et al. | 353/31 |
| 7,413,311 B2 * | 8/2008 | Govorkov et al. | 353/34 |
| 2002/0191158 A1 * | 12/2002 | Koyama et al. | 353/31 |
| 2004/0008392 A1 * | 1/2004 | Kappel et al. | 359/15 |
| 2006/0250587 A1 * | 11/2006 | Grasser et al. | 353/99 |
| 2006/0279702 A1 * | 12/2006 | Kettle et al. | 353/20 |

FOREIGN PATENT DOCUMENTS

| | | |
|---|---|---|
| JP | A-06-273432 | 9/1994 |
| JP | A 11-38512 | 2/1999 |
| JP | A 2001-100316 | 4/2001 |
| JP | A-2002-214579 | 7/2002 |
| JP | A-2002-344050 | 11/2002 |
| JP | A 2006-47422 | 2/2006 |
| JP | A-2008-158190 | 7/2008 |

* cited by examiner

*Primary Examiner* — Tony Ko
*Assistant Examiner* — Jori S Reilly-Diakun
(74) *Attorney, Agent, or Firm* — Oliff & Berridge, PLC

(57) ABSTRACT

An image display apparatus includes: a light source emitting light; a spatial light modulator having a display region, and modulating the light emitted from the light source in accordance with an image signal; a projection device projecting the light modulated by the spatial light modulator onto a projection surface including an illumination region; and a deflecting section deflecting the light that is emitted from the light source and is then incident on the spatial light modulator. In this structure, the light emitted from the light source illuminates a part of the display region of the spatial light modulator, the light is deflected by the deflecting section, and the illumination region illuminated by the light moves on the projection surface.

8 Claims, 10 Drawing Sheets

(a) SPECKLE PATTERN IN ILLUMINATION REGION L1

(b) SPECKLE PATTERN IN ILLUMINATION REGION L2

PRIOR ART

IMAGE DISPLAY APPARATUS

CROSS-REFERENCE TO RELATED APPLICATION

This application claims priority from Japanese Patent Application No. 2006-199262, filed Jul. 21, 2006, the contents of which are incorporated herein by reference.

BACKGROUND

1. Technical Field

The present invention relates to an image display apparatus.

2. Related Art

In recent years, projectors have come into wide use.

In addition to a front projection type projector that is used mainly for business presentation, recently recognition of a rear projection type projector as a form of a large-sized television (PTV: projection television) is growing.

The biggest advantage of a projection type display apparatus is that the projection type display apparatus can provide a screen having the same size as direct view type displays, such as a liquid crystal television or a PDP, with a low cost compared to direct view type displays.

However, as direct view type displays are also becoming cheap, high resolution and performance are required even for projection type display apparatuses.

A projector illuminates light emitted from a light source, such as an arc lamp, onto a light modulation element, such as a liquid crystal light valve and projects light modulated by the light modulation element onto a screen, such that an image is displayed on the screen.

At this time, an image is displayed on the screen but the entire surface of the screen glares.

This is referred to as speckle noise or scintillation, since the phenomenon occurs due to brightness unevenness caused by interference between light beams.

Here, a principle of occurrence of the scintillation will now be described.

As shown in FIG. 15, light beams emitted from a light source 101 are transmitted through a liquid crystal light valve 102 and are then projected onto a screen 104 by a projection lens 103.

The projection light projected onto the screen 104 is diffracted due to a scattering structure of the screen 104, and the diffracted light beams are diffused while moving like two-dimensional waves.

Two spherical waves of the two-dimensional waves strengthen or weaken each other depending on the phase relationship therebetween. As a result, the spherical waves appear as striped patterns (interference fringes) of brightness and darkness between the screen 104 and a viewer.

When the eyes of the viewer focus on an image surface 105 on which the interference fringes occur, the viewer recognizes the interference fringes as scintillation that causes the screen surface to glare.

The scintillation causes a viewer, who desires to watch an image formed on the screen surface, to feel as if a veil, a lace cloth, or a cobweb exists between the screen surface and the viewer.

In addition, since the viewer watches double images including an image formed on the screen and the scintillation and the eyes of the viewer focus on both images, the viewer's eyes can become fatigued.

As a result, the scintillation causes such a large stress that the viewer cannot stand.

In recent years, a new light source that will substitute for a known high-pressure mercury lamp is under development. In particular, the expectation of a laser light source as a next-generation light source for a projector is increasing in terms of energy efficiency, color reproduction, long life, instantaneous lighting, or the like.

However, in the case of projection light that is projected on the screen by the laser light source, extremely high interference occurs since phases of light beams of adjacent regions are equal.

In the case of a laser light source, the coherent length may amount to even several tens of meters. Accordingly, when light beams emitted from the same light source are split and then recombined, light beams combined through an optical path difference shorter than the coherent length cause strong interference.

As a result, scintillation (interference fringes) occurs that is more distinct than that in the case of the high-pressure mercury lamp.

For this reason, particularly in the case of commercial production of a projector using a laser light source, reduction of the scintillation is an indispensable technique.

Japanese Unexamined Patent Application, First Publication No. H11-38512, Japanese Unexamined Patent Application, First Publication No. 2001-100316, and Japanese Unexamined Patent Application, First Publication No. 2006-47422 disclose techniques for reducing the scintillation.

Japanese Unexamined Patent Application, First Publication No. H11-38512 discloses a screen whose diffusion property is optimized and which has a three-layered structure including a diffusion layer, a transparent layer (lenticular lens), and another diffusion layer.

In this case, the random nature of interference spots becomes large due to the diffusion layers that are made complicated.

Therefore, if fine components (interference fringes with low spatial frequencies) increase in spots, light beams are integrated and averaged due to the frame rate at which humans see (hereinafter termed "the afterimage effect") when a viewer's line of sight moves.

Particularly in the case of motion pictures, since the movement of viewer's line of sight occurs frequently, reduction of the scintillation may be expected.

Japanese Unexamined Patent Application, First Publication No. 2001-100316 discloses a screen in which light beams, an electric field, a magnetic field, heat, or the like are applied to a light scattering layer. In this screen, shape, relative position, or refractive index of light of the light scattering member, contained in the light scattering layer, changes with time.

Thus, the occurrence of scintillation may be expected to be reduced by temporally changing the scattering distribution or phases of scattered waves generated by the light scattering layer.

Japanese Unexamined Patent Application, First Publication No. 2006-47422, an image projection apparatus includes: a laser light source that emits light beams having coherence; a half wavelength plate (polarization control unit) that temporally changes the polarizing direction of the light beams emitted from the laser light source; and an MEMS mirror and a galvano mirror (scan device) that cause the laser beams emitted from the polarization control unit to be scanned in the two-dimensional direction of a scan surface.

In addition, a speckle pattern (speckle intensity) generated in each pixel changes for each frame by rotating the half wavelength plate.

For example, in the case in which each frame is drawn at a frame rate of 60 Hz (sixty number of frames are drawn during one second), each frame which is drawn at every 1/60 second is not viewed by a human. Furthermore, sixty frames are drawn during one second, then intensities of speckle patterns generated in each frame is integrated due to the afterimage effect. Therefore, the speckle pattern occurring at each frame is not viewed. As a result, the images in which the speckles are reduced are drawn.

As described above, by wobbling laser beams emitted from a light source using the polarization control unit or rotating the half wavelength plate so as to change the polarization, speckles of light emitted from a screen are reduced.

However, in the technique disclosed in Japanese Unexamined Patent Application, First Publication No. H11-38512, the scattering state of a final scattering surface is fixed. Accordingly, the phase distribution in the space, in which interference between light beams generated from respective spots on the scattering surface occurs, between a screen and a viewer is also fixed. As a result, even interference spots are viewed as a fixed image.

Therefore, the interference spots do not disappear completely. Particularly in the case of a projector having a highly coherent laser light source, there is little effect of the technique.

In addition, since there is concern that image blurring will occur in the above configuration of raising the light scattering level, it was not possible to realize the original object which was to increase the resolution.

Furthermore, in the technique disclosed in Japanese Unexamined Patent Application, First Publication No. 2001-100316, a large amount of driving energy is needed because the shape, relative position relationship, or refractive index of light scattering member changes.

In addition, in the case of using a driving unit, the efficiency of energy transferred to the scattering layer is low, and vibration, sound, unnecessary electromagnetic waves, and exhaust of heat occurs. As a result, there is concern that comfortable appreciation of images projected on a screen is degraded.

Moreover, in the configuration in which the scattering layer moves in the focus direction, the size of the image changes.

As a result, the position of the border line of the image in the horizontal direction also changes, which is a cause of image blurring.

Furthermore, in the image projection apparatus disclosed in Japanese Unexamined Patent Application, First Publication No. 2006-47422, the polarization of laser beams emitted from the laser light source changes. This is effective for a scan type image display apparatus that scans light in order to project the light.

However, this configuration cannot be applied to image display apparatuses using spatial light modulators (for example, transmissive liquid crystal panel, reflective liquid crystal panel, or DMD).

SUMMARY

An advantage of some aspects of the invention is to provide an image display apparatus, in which it is possible to reliably prevent scintillation of light emitted from a spatial light modulator and to increase the grade of image quality.

A first aspect of the invention provides an image display apparatus including: a light source emitting light; a spatial light modulator having a display region, and modulating the light emitted from the light source in accordance with an image signal; a projection device projecting the light modulated by the spatial light modulator onto a projection surface including an illumination region; and a deflecting section deflecting the light that is emitted from the light source and is then incident on the spatial light modulator. In this image display apparatus, the light emitted from the light source illuminates a part of the display region of the spatial light modulator, the light is deflected by the deflecting section, and the illumination region illuminated by the light moves on the projection surface.

In the image display apparatus according to the first aspect of the invention, the light emitted from the light source illuminates a part of the display region of the spatial light modulator.

In addition, the light that has illuminated the part of the spatial light modulator moves on the spatial light modulator by the deflecting section.

The illumination region on the projection surface illuminated by the light moves in accordance with the movement of the light.

As described above, since an illumination region on the projection surface moves, the scattering center varies on the projection surface according to the illumination region.

Thus, the scattering state of light emitted from the projection surface changes variously to move interference fringes that are viewed, such that a pattern of interference fringes changes in a more complicate manner.

As a result, since light beams emitted from the projection surface are integrated and averaged due to an afterimage effect, the interference fringes are not viewed.

That is, since an image is held in human eyes for a certain period of time due to the afterimage effect, the image is uniformly displayed so as to be viewed by human eyes.

Accordingly, the interference fringes generated between the projection surface and the viewer are eliminated, resulting in a reduction of the scintillation.

Therefore, a blurry image occurring due to the scintillation (blurry image due to display unevenness or glaring) is eliminated, which allows the viewer's eyes to be less fatigued.

Furthermore, in the invention, a diffusion layer does not move in the focal direction unlike the related art. Accordingly, since image blurring due to scattering of light does not occur, an image is satisfactorily viewed.

Thus, it is possible to obtain an image which includes high brightness, high resolution, and high quality.

In addition, since the light emitted from the light source moves on the projection surface due to the deflecting section, the light does not stop at a point on the retina of the human eye.

That is, the image display apparatus according to the first aspect of the invention is excellent in terms of usability.

It is preferable that, in the image display apparatus of the first aspect of the invention, the deflecting section include: a liquid crystal element that rotates a plane of polarization; and an optical member having a birefringence property.

In the image display apparatus according to the first aspect of the invention, the light emitted from the light source is incident on the liquid crystal element.

In addition, a plane of polarization of transmitted light changes with time according to a state of voltage application.

By causing light, of which a plane of polarization has been changed, to be incident on the optical member having the birefringence property, the light emitted from the optical member deflects according to the plane of polarization of incident light.

Accordingly, since an illumination region illuminated by the light emitted from the spatial light modulator moves on a projection surface, scintillation of the light emitted from the projection surface is suppressed.

Thus, in the image display apparatus according to the first aspect of the invention, it is possible to cause light emitted from the optical member to be deflected only by driving a liquid crystal element with a voltage. Accordingly, the configuration of the entire apparatus can be simplified.

It is preferable that, in the image display apparatus of the first aspect of the invention, the deflecting section be a hologram element.

In the image display apparatus according to the first aspect of the invention, for example, a computer generated hologram (CGH) formed with interference fringes, which are artificially created on a hologram plate is used on the basis of calculation using a calculator.

The computer generated hologram is suitable because a divided region of a diffraction grating can be freely set, and accordingly, a problem of aberration does not occur.

It is preferable that the semiconductor device of the first aspect of the invention further include a condensing section condensing the light emitted from the light source as line-shaped light.

In the image display apparatus according to the first aspect of the invention, the light emitted from the light source is condensed as line-shaped light by the condensing section.

Accordingly, since the scanning direction of light emitted from the light source may be a one-dimensional direction, it is possible to easily control the deflection of the light emitted from the light source.

It is preferable that the semiconductor device of the first aspect of the invention further include a condensing section condensing the light emitted from the light source as dot-shaped light.

In the image display apparatus according to the first aspect of the invention, the light emitted from the light source is condensed into a dot-shaped light by the condensing section.

In this case, the scanning direction of light emitted from the light source is a two-dimensional direction, but an illumination region on the projection surface has a dot shape. Accordingly, it is necessary to scan light at high speed as compared with a case of scanning line-shaped light.

That is, since different speckle patterns move at high speed even though the scanning direction of the light emitted from the light source is the two-dimensional direction, the speckle patterns are integrated and averaged due to an afterimage effect.

As a result, the scintillation can be even more suppressed.

It is preferable that, in the image display apparatus of the first aspect of the invention, the light which is incident on the spatial light modulator is a beam.

In the image display apparatus according to the first aspect of the invention, light incident on the spatial light modulator is a beam of light, that is, a single beam. Accordingly, the configuration of the apparatus is simplified, which makes assembling of the entire apparatus simple.

In addition, it is possible to easily control the position or the like of light when illuminating a part of the spatial light modulator.

It is preferable that, in the image display apparatus of the first aspect of the invention, the light which is incident on the spatial light modulator is a plurality of beams.

In the image display apparatus according to the first aspect of the invention, the intensity of light in a case in which the light incident on the spatial light modulator is a plurality of beams, that is, multiple beams is weaker than that in a case in which the light incident on the spatial light modulator is a single beam.

Accordingly, since it is possible to prevent a damage occurring in a case in which high-output light is illuminated onto the spatial light modulator, a highly reliable spatial light modulator can be obtained.

Moreover, since the intensity of light illuminated onto the spatial light modulator is weak, flicker of the light emitted from a projection surface is also reduced, which causes less fatigue.

Thus, a viewer's fatigue level due to scintillation is further reduced.

A second aspect of the invention provides an image display apparatus including: a light source emitting light; a spatial light modulator having a plurality of pixels, and modulating the light emitted from the light source in accordance with an image signal; a projection device projecting the light modulated by the spatial light modulator onto a projection surface including an illumination region; and a deflecting section deflecting the light emitted from the spatial light modulator. In this image display apparatus, the size of an opening region of each pixel of the spatial light modulator is smaller than a pitch of the pixels, the light emitted from the spatial light modulator is deflected by the deflecting section, the illumination region illuminated by light emitted from each pixel of the spatial light modulator moves on the projection surface within a range smaller than the pixel pitch of the spatial light modulator.

In the image display apparatus according to the second aspect of the invention, the light emitted from the light source illuminates each pixel of the spatial light modulator.

In addition, the light emitted from the spatial light modulator moves on the spatial light modulator by the deflecting section.

At this time, the illumination region illuminated by the light emitted from each pixel of the spatial light modulator moves on the projection surface within a range smaller than the pixel pitch of the spatial light modulator.

As described above, since an illumination region on the projection surface moves, a scattering center varies according to the illumination region.

Thus, the scattering state of light emitted from the projection surface changes variously to move interference fringes that are viewed, such that a pattern of interference fringes changes in a more complicate manner.

As a result, since light beams emitted from the projection surface are integrated and averaged due to the afterimage effect, the interference fringes are not viewed.

That is, since an image is held in human eyes for a certain period of time due to the afterimage effect, the image is uniformly displayed so as to be viewed by human eyes.

Accordingly, the interference fringes generated between the projection surface and the viewer are eliminated, resulting in a reduction of the scintillation.

Therefore, a blurry image occurring due to the scintillation (blurry image due to display unevenness or glaring) is eliminated, which allows the viewer to be less fatigued.

In addition, in the invention, a diffusion layer does not move in the focal direction unlike the related art. Accordingly, since image blurring due to scattering of light does not occur, an image is satisfactorily viewed.

Thus, it is possible to obtain an image which includes high brightness, high resolution, and high quality.

In addition, since the illumination region moves on the projection surface within a range smaller than the pixel pitch of the spatial light modulator, pixels of an adjacent spatial light modulator are not affected.

In addition, as the opening region of the spatial light modulator is smaller than the pixel pitch, it is possible to increase the amount of movement of the illumination region illuminated by the light emitted from each pixel of the spatial light modulator.

As a result, the scintillation can be even more suppressed.

In addition, since the light emitted from the light source moves on the projection surface due to the deflecting section, the light does not stop at a point on the retina of a human eye.

That is, the image display apparatus according to the second aspect of the invention is excellent in terms of usability.

It is preferable that, in the image display apparatus of the second aspect of the invention, the deflecting section include: a liquid crystal element that rotates a plane of polarization; and an optical member having a birefringence property.

In the image display apparatus according to the second aspect of the invention, the light emitted from the light source is modulated according to an image signal by the spatial light modulator and then the modulated light is incident on the liquid crystal element.

In addition, a plane of polarization of transmitted light changes with time according to a state of voltage application.

By causing light, of which a plane of polarization has been changed, to be incident on the optical member having the birefringence property, the light emitted from the optical member deflects according to a plane of polarization of incident light.

Thus, the light emitted from the spatial light modulator is deflected by switching a voltage applied to a liquid crystal element from ON to OFF or OFF to ON.

Accordingly, since an illumination region illuminated by the light emitted from each pixel of the spatial light modulator moves on a projection surface, the scintillation of the light emitted from the projection surface is suppressed.

Thus, in the image display apparatus according to the second aspect of the invention, it is possible to cause the light emitted from the spatial light modulator to be deflected only by driving a liquid crystal element with a voltage.

Accordingly, the configuration of the entire apparatus can be simplified.

It is preferable that, in the image display apparatus of the second aspect of the invention, the deflecting section be a piezoelectric element that allows the spatial light modulator to move.

In the image display apparatus according to the second aspect of the invention, an illumination region illuminated by the light emitted from each pixel of the spatial light modulator moves on the projection surface by causing the spatial light modulator to move (vibrate) by the piezoelectric element.

That is, since the deflecting section is a piezoelectric element, it is possible to suppress sound and vibration from being generated.

Accordingly, it is possible to prevent noises from being generated at the time of driving the piezoelectric element. As a result, a very silent rear projector can be provided.

DESCRIPTION OF EXEMPLARY EMBODIMENTS

Figure 1A:
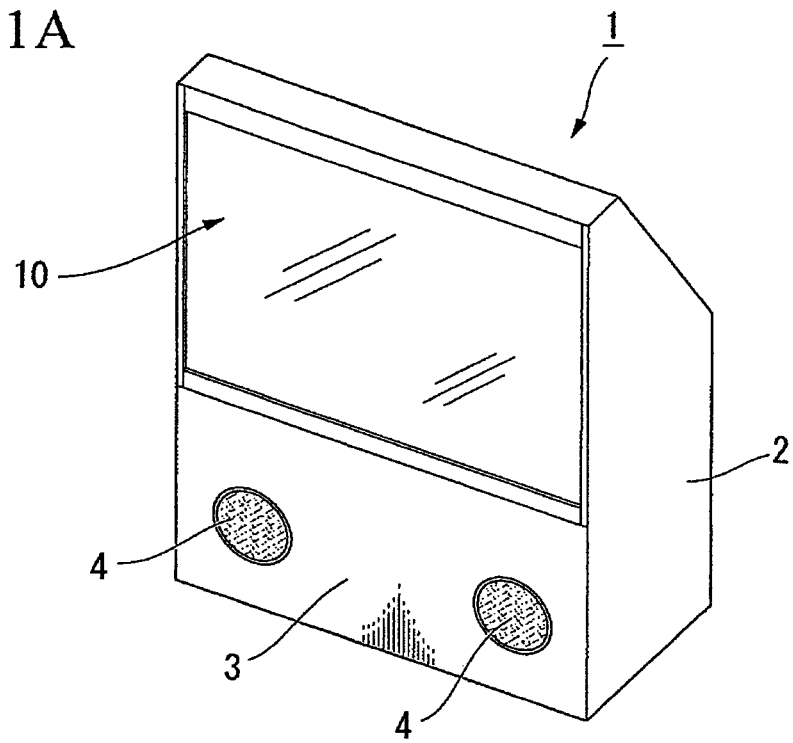
FIG. 1A is a schematically perspective view of the configuration of an image display apparatus according to a first embodiment of the invention.

Hereinafter, image display apparatuses according to embodiments of the invention will be described with reference to the accompanying drawings.

In addition, scales of individual members in the drawings to be referred below are appropriately changed so that each member can have a recognizable size.

First Embodiment

Figure 1B:
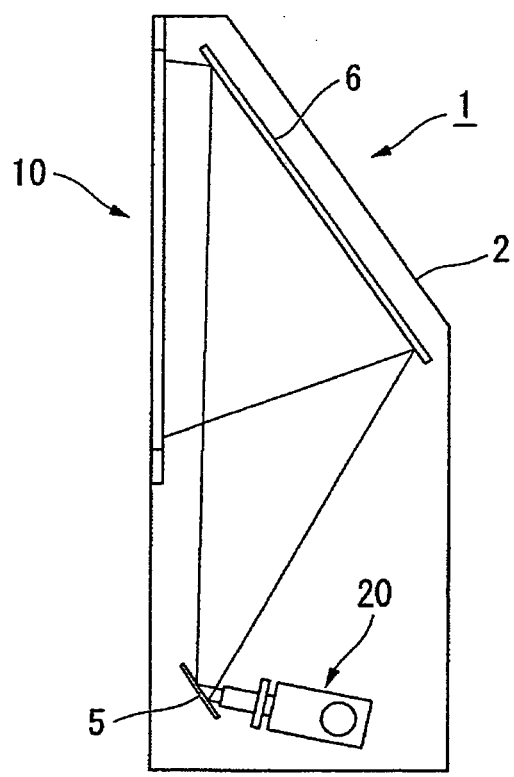
FIG. 1B is a schematically cross-sectional view of the configuration of the image display apparatus according to the first embodiment of the invention.

FIG. 1A is a perspective view schematically illustrating the configuration of a rear projector (image display apparatus) 1 according to a first embodiment of the invention, and FIG. 1B is a cross-sectional view illustrating the rear projector 1 shown in FIG. 1A.

The rear projector 1 according to the first embodiment modulates light emitted from a light source by using a light modulation unit and then projects the modulated light onto a screen 10 in an enlarged manner.

As shown in FIG. 1A, the rear projector 1 includes a housing 2 and the screen 10 which is mounted on a front surface of the casing 2 and onto which an image is projected.

In addition, a front panel 3 is provided below the screen 10 in the housing 2.

In addition, openings 4 used to output sounds from speakers are provided at left and right sides of the front panel 3.

Next, the internal structure of the housing 2 of the rear projector 1 will be described.

As shown in FIG. 1B, a projection optical system 20 is provided at a lower portion of the housing 2 of the rear projector 1.

Reflective mirrors 5 and 6 are provided between the projection optical system 20 and the screen 10.

Light beams emitted from the projection optical system 20 are reflected by the reflective mirrors 5 and 6, and are then projected onto the screen 10 in an enlarged manner.

Next, the schematic configuration of the projection optical system 20 of the rear projector 1 will be described.

Figure 2:
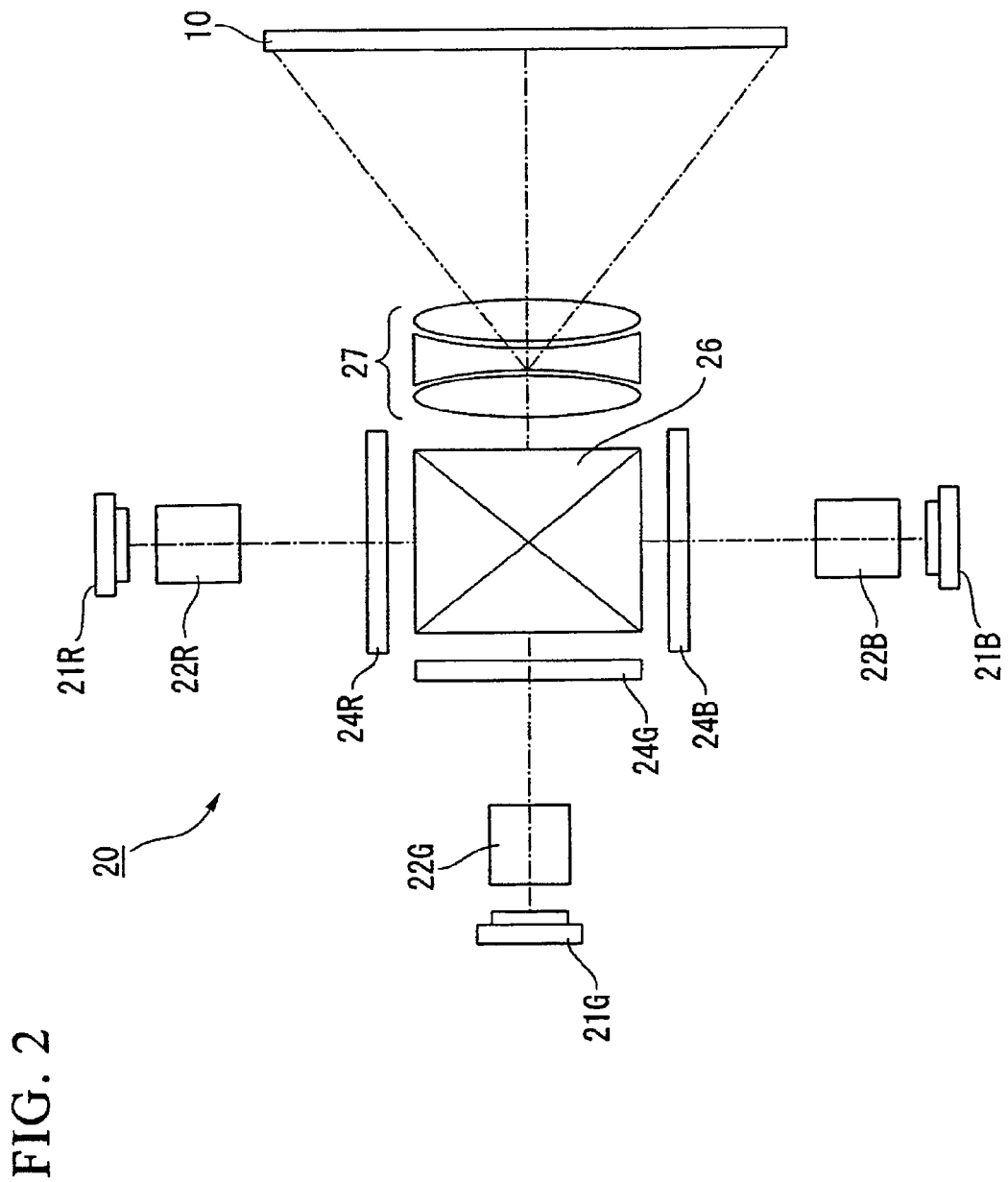
FIG. 2 is a schematic view of the configuration of a projection optical system shown in FIG. 1B.

FIG. 2 is a view schematically illustrating the configuration of the projection optical system 20 of the rear projector 1.

In FIG. 2, the housing 2 included in the rear projector 1 is omitted.

As shown in FIG. 2, the projection optical system 20 includes a red laser light source (light source device) 21R, a green laser light source (light source device) 21G, a blue laser light source (light source device) 21B, liquid crystal light valves (spatial light modulators) 24R, 24G, and 24B, a cross dichroic prism (color light combining section) 26, and a projection lens (projection device) 27.

The red laser light source 21R emits red light. The green laser light source 21G emits green light. The blue laser light source 21B emits blue light.

Each of the liquid crystal light valves (spatial light modulators) 24R, 24G, and 24B has a plurality of pixels 24a and modulates laser beams emitted from each of the red laser light source 21R, green laser light source 21G, and blue laser light source 21B in accordance with an image signal.

The cross dichroic prism 26 causes the laser beams modulated by the liquid crystal light valves 24R, 24G, and 24B to be combined.

The projection lens 27 projects laser beams combined by the cross dichroic prism 26 in an enlarged manner.

In addition, the projection optical system 20 has illumination optical systems 22R, 22G, and 22B. The illumination optical system 22R is arranged behind the red laser light source 21R. The illumination optical system 22G is arranged behind the green laser light source 21G. The illumination optical system 22B is arranged behind the blue laser light source 21B.

Each of the illumination optical systems 22R, 22G, and 22B functions as a uniform illumination system for making uniform the brightness distribution of the laser beams emitted from each of the red laser light source 21R, green laser light source 21G, and blue laser light source 21B.

The illumination optical systems 22R, 22G, and 22B emit laser beams to the liquid crystal light valves 24R, 24G, and 24B, respectively.

Moreover, in each of the liquid crystal light valves 24R, 24G, and 24B, a polarization plate (not shown) is disposed on a surface on which a light beam is incident and a surface from which a laser beam is emitted.

In addition, among light beams of the red laser light source 21R, the green laser light source 21G, and the blue laser light source 21B, only light beams that are linearly polarized in a predetermined direction are transmitted through the incident-side polarization plates to be then incident on the liquid crystal light valves 24R, 24G, and 24B.

Furthermore, a polarization conversion section (not shown) may be provided ahead of each incident polarization plate.

In this case, since the polarization conversion section converts light beams so as to be transmitted through the incident polarization plate, it is possible to improve the light using efficiency.

Three color light components modulated by the liquid crystal light valves 24R, 24G, and 24B are incident on the cross dichroic prism 26.

The prism 26 is formed by bonding four rectangular prisms together, and a dielectric multi-layered film that reflects red light and a dielectric multi-layered film that reflects blue light are crosswise disposed.

Three color light components are combined by the dielectric multi-layered films, such that light displaying a color image is formed.

In addition, the combined light is projected onto the screen 10 by the projection lens 27 that is a projection optical system, and thus an enlarged image is displayed.

Next, details of an illumination optical system will be described in detail with reference to FIG. 3.

Since the illumination optical system 22R, the illumination optical system 22G, and the illumination optical system 22B have the same configuration, the illumination optical system 22R corresponding to red light will be described below as an example.

Figure 3:
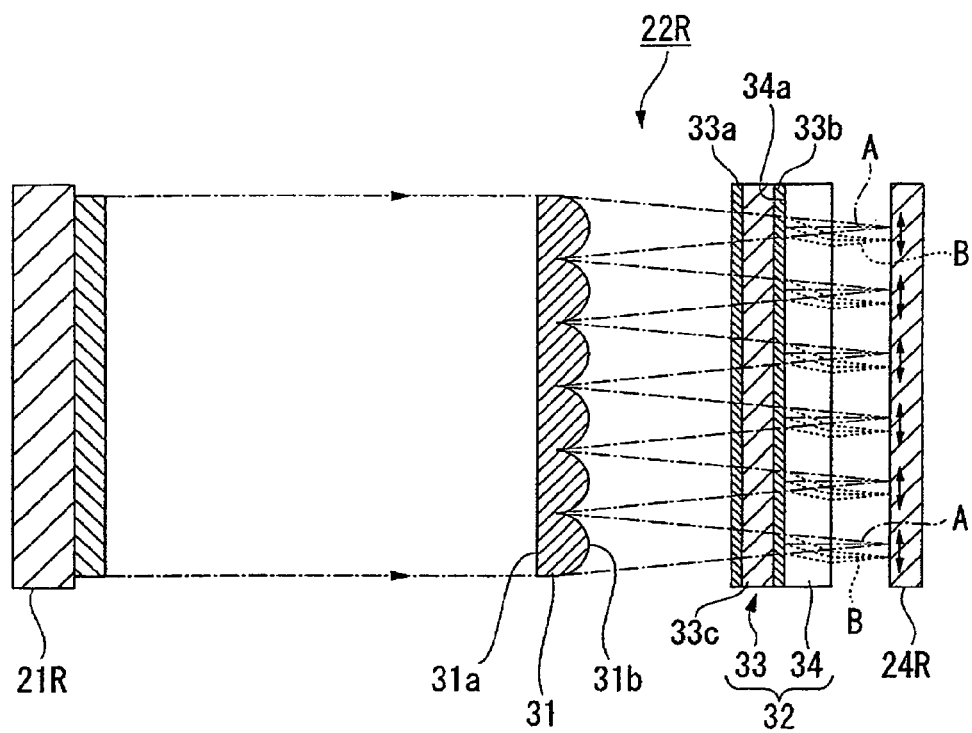
FIG. 3 is a schematic view of a red light section of the projection optical system shown in FIG. 2.

In FIG. 3, the cross dichroic prism 26 is not shown.

As shown in FIG. 3, the illumination optical system 22R includes a lenticular lens array (condensing section) 31 and a deflection element (deflecting section) 32.

The lenticular lens array 31 condenses light beams that are emitted from the laser light source 21R and are then collimated by a collimating section (not shown).

The deflection element 32 causes light beams emitted from the lenticular lens array 31 to be deflected.

A plurality of curved surfaces is formed on an emission-side surface 31b of the lenticular lens array 31.

Accordingly, parallel beams incident on an incidence-side surface 31a of the lenticular lens array 31 are condensed as a plurality of line-shaped beams, that is, multiple beams on the respective curved surfaces.

In addition, the smaller the vertical width of light condensed by the lenticular lens array 31, the better. However, there is a limitation on the vertical width of the light condensed by the lenticular lens array 31 due to a diffraction limit of light and restriction of a lens design condition ($\in=0.61\lambda/NA$, $\in$: radius of light condensed by a lenticular lens array, $\lambda$: wavelength of incident light, $NA=n \cdot \sin(\theta/2)$).

Therefore, for example, it is preferable that the width of light condensed by the lenticular lens array 31 be narrowed to about several micrometers on the liquid crystal light valve 24R.

Next, light on a liquid crystal light valve will be described.

Figure 4:
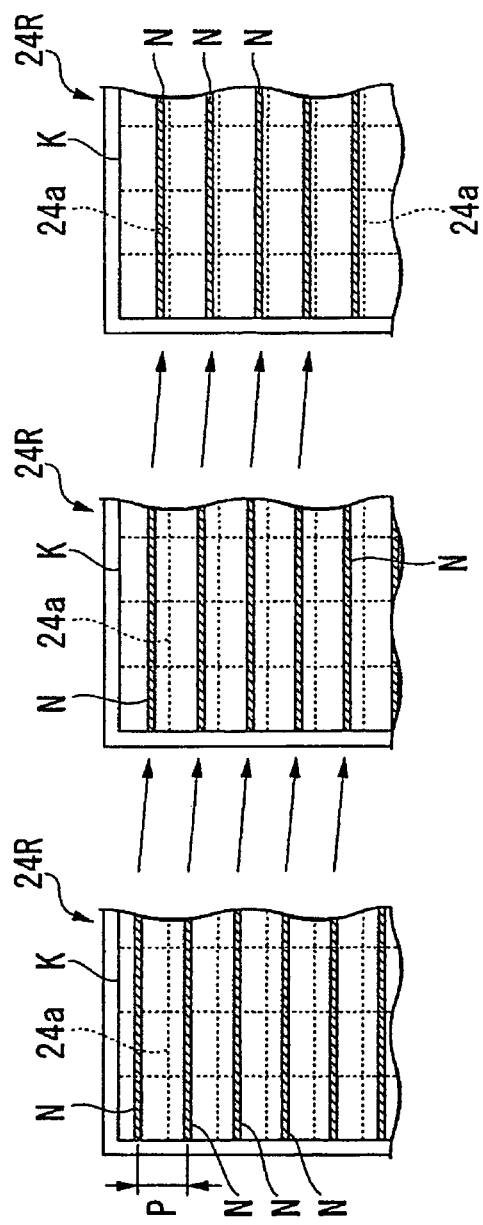
FIG. 4 is a plan view of an illumination region of light projected onto a screen shown in FIG. 1.

First, as shown in FIG. 4, line-shaped light N emitted from the lenticular lens array 31 is light sufficiently smaller than, specifically, one of the pixels 24a in a display region K of the liquid crystal light valve 24R.

That is, the line-shaped light N illuminates a region narrower than one pixel 24a.

The line-shaped light N is deflected by the deflection element 32 and moves on the pixel 24a of the liquid crystal light valve 24R.

Here, the size of an illumination region L of the line-shaped light N with respect to the size of one pixel 24a is a size that allows interference fringes of light emitted from the screen 10 to be sufficiently changed, integrated, and averaged.

That is, a lenticular lens array 31 that satisfies the condition is used.

Furthermore, as shown in FIG. 4, a distance P between adjacent line-shaped light beams N is adjusted such that adjacent line-shaped light beams do not cause interference therebetween.

Furthermore, the line-shaped light N is deflected by the deflection element 32 to be projected onto the screen 10 through the liquid crystal light valve 24R.

Figure 5:
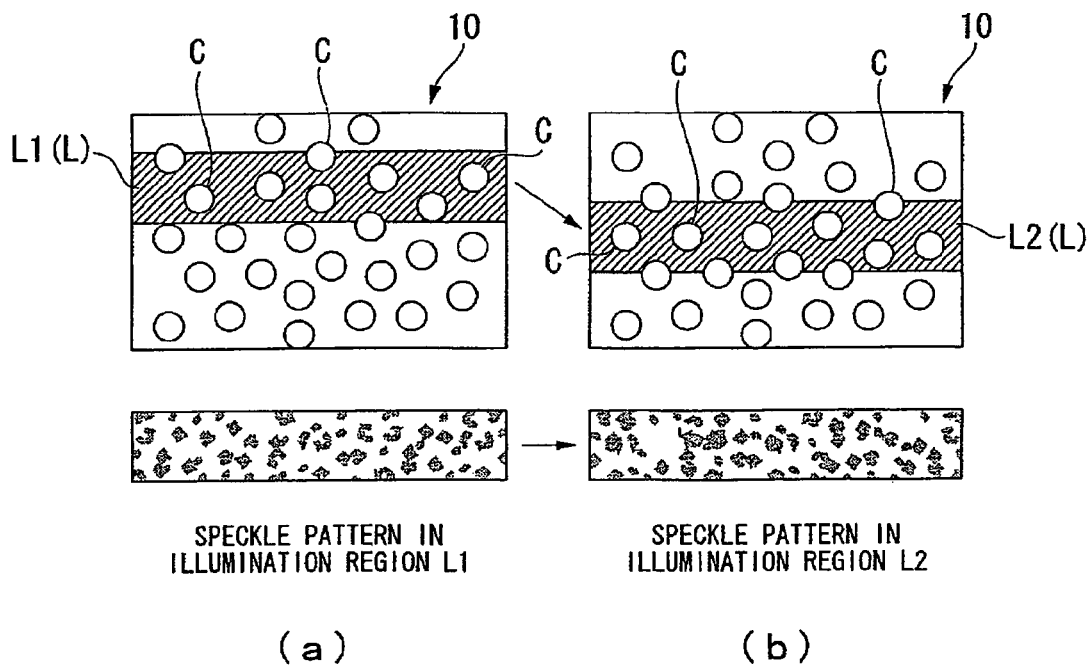
FIG. 5 is a view of the movement of an illumination region of light projected onto the screen shown in FIG. 1.

FIG. 5 illustrate a part of the screen 10. The illumination region L in the screen 10 moves from an upper part of the screen 10, which is shown in part (a) of FIG. 5, to a lower part of the screen 10, which is shown in part (b) of FIG. 5.

At this time, scatter centers C in an illumination region L1 of the screen 10 shown in part (a) of FIG. 5 are arranged to be different from scatter centers C in an illumination region L2 shown in part (b) of FIG. 5.

Accordingly, a speckle pattern in the illumination region L1 and a speckle pattern in the illumination region L2, which are formed by secondary radiation from between the scattering centers C existing in the regions L1 and L2, are different from each other.

Thus, since the illumination region L in the screen 10 moves, light beams emitted from the screen 10 are integrated and averaged due to the afterimage effect, such that the interference fringes are not viewed.

That is, since an image is held in human eyes for a certain period of time due to an afterimage, the image is uniformly displayed to be viewed by human eyes.

Accordingly, the interference fringes generated between a projection surface and a viewer are eliminated, resulting in reduction of the scintillation.

Next, a deflection element will be described.

The deflection element 32 includes a liquid crystal element 33 that rotates a plane of polarization of incident light and a phase plate (optical member) 34 having a birefringence property.

As shown in FIG. 3, the liquid crystal element 33 includes a first electrode 33*a*, a second electrode 33*b*, and a liquid crystal layer 33*c* interposed between the first electrode 33*a* and the second electrode 33*b*.

The first electrode 33*a* and the second electrode 33*b* are connected to a driving circuit (not shown).

The driving circuit controls a voltage applied to the liquid crystal element 33 and temporally changes a plane of polarization of light emitted from the liquid crystal element 33.

Specifically, the liquid crystal element 33 sealed with liquid crystal in a TN (twisted nematic) mode is used.

In addition, when an output from the driving circuit is 20 V, the plane of polarization of light incident on the liquid crystal element 31 does not change even after light emission.

That is, under a state in which the plane of polarization of light when the light is incident on the liquid crystal element 33 is held, light is emitted from the liquid crystal element 33 to be then incident on the phase plate 34.

In addition, when the output from the driving circuit is 0 V, light incident on the liquid crystal element 33 is transmitted through the liquid crystal element 33, such that the plane of polarization of light rotates 90° with respect to that before the light is incident on the liquid crystal element 33.

That is, under a state in which the plane of polarization of light when the light is incident on the liquid crystal element 33 is rotated 90° with respect to that before, light is emitted from the liquid crystal element 33 to be then incident on the phase plate 34.

Due to the characteristic of the liquid crystal element 33, when a voltage applied to the liquid crystal element 33 is changed between 0 V and 20 V, the light emitted from the liquid crystal element 33 becomes light having a plane of polarization according to a state of liquid crystal molecules inside the liquid crystal element 33 and is then incident on the phase plate 34.

For example, the switching frequency of the voltages between 0 V and 20 V applied to the liquid crystal element 33 is set to a frequency higher than the frequency of flicker that can be perceived by human beings. For example, the frequency is set at greater than or equal to 30 Hz, preferably, greater than or equal to 60 Hz.

The phase plate 34 is an element having a refractive index different according to a plane of polarization of incident light.

That is, since the plane of polarization of light incident on the phase plate 34 changes with time, the light incident on the phase plate 34 is refracted on an incident-side surface 34*a* of the phase plate 34 at an angle corresponding to the plane of polarization, as shown in FIG. 3.

Accordingly, as shown in FIG. 3, the light emitted from the phase plate 34 moves on the liquid crystal light valve 24R from a state of light A (indicated by one-dotted chain line) to a state of light B (indicated by broken line).

Moreover, specifically, as the phase plate 34, an anisotropic refractive element, such as calcite (containing calcium carbonate as a component) or crystal (quartz; containing silicon dioxide as a component), may be used.

In addition, the speed at which the line-shaped light N moves from the upper surface toward the lower surface of the screen 10 is a speed that allows the interference fringes of the light emitted from the screen 10 to change sufficiently fast as compared with afterimage time of eyes and to be integrated and averaged.

That is, it is possible to satisfy a condition of the speed by changing a switching frequency of the driving voltage of the liquid crystal element 33 or a material of the phase plate 34.

In the rear projector 1 according to this embodiment, since the line-shaped light N smaller than one pixel 24*a* moves on the screen 10, the scattering state of the light emitted from the screen 10 changes variously to move interference fringes that are viewed, such that a pattern of the interference fringes changes in a more complicated manner.

As a result, the interference fringes generated between the screen 10 and the viewer are eliminated, which reduces the scintillation.

Therefore, a blurry image occurring due to the scintillation (blurry image due to display unevenness or glaring) is eliminated, which allows to be less fatigued.

Furthermore, in the invention, a diffusion layer does not move in the focal direction unlike the related art. Accordingly, since image blurring due to scattering of light does not occur, an image is satisfactorily viewed.

As described above, it is possible to obtain an image with high brightness, high resolution, and high quality.

Furthermore, since it is sufficient that the scanning direction of light emitted from the laser light sources 21R, 21G, and 21B is one dimension in order to illuminate the liquid crystal light valves 24R, 24G, and 24B using the line-shaped light N, it is possible to easily control the deflection of the light emitted from the laser light sources 21R, 21G, and 21B.

Furthermore, since the light incident on the liquid crystal light valves 24R, 24G, and 24B is multiple beams, the intensity of each light beam becomes weak compared to the case of a single beam.

Accordingly, it is possible to prevent the liquid crystal light valves 24R, 24G, and 24B from being damaged in the case in which high-output light is illuminated. As a result, the reliability of the liquid crystal light valves 24R, 24G, and 24B is improved.

In addition, in the case of a light source that emits multiple beams, the intensity of light illuminated on the liquid crystal light valves 24R, 24G, and 24B is weak as compared with a light source that emits a single beam. Accordingly, flickering of light emitted from a projection surface decreases, which allows a viewer to be less fatigued.

Thus, the rear projector 1 according to the embodiment of the invention may be applied to an image display apparatus having the liquid crystal light valves 24R, 24G, and 24B and is capable of reliably preventing the scintillation and of creating a high-resolution image.

In addition, as the laser light sources 21R, 21G, and 21B, a light source capable of performing surface beam illumination, a light source using a surface emitting laser, or a surface light source in which light beams emitted from a laser chip array overlap each other using holograms may be used.

Moreover, as the deflection element 32 instead of the liquid crystal element 33 and the phase plate 34, a hologram element, a rotating prism, a mirror scan, or the like may be used.

For example, a computer generated hologram (CGH) formed with interference fringes, which are artificially created on a hologram plate on the basis of calculation using a calculator, is used as the hologram element.

The computer generated hologram is suitable because a divided region of a diffraction grating can be freely set, and accordingly, a problem of aberration does not occur.

Furthermore, an element using interference such as a hologram may be used as a means for making incident light narrowed in the line shape, even though it is simple to adopt an element using refraction, such as the lenticular lens array 31.

In addition, although the light beams emitted from the laser light source 21R are condensed by the lenticular lens array 31, it is possible to use a condensing section that condenses the light beams emitted from the laser light source 21R as dot-shaped light.

In the case in which the light emitted from the laser light source 21R is dot-shaped light, the scanning direction of the light emitted from the laser light source 21R is a two-dimensional direction but an illumination region on the screen 10 has a dot shape. Accordingly, as compared with a case of scanning the line-shaped light in the present embodiment, the illumination region of the screen 10 is illuminated in detail.

Accordingly, as the illumination region L having different speckle patterns increases, it is possible to further suppress the scintillation.

In addition, although the light incident on the liquid crystal light valves 24R, 24G, and 24B are multiple beams, the light incident on the liquid crystal light valve may be one beam, that is, a single beam.

In the case of a single beam, an assembly work of the whole apparatus becomes easy because the structure thereof is simple.

In addition, it is possible to easily control, for example, the position of light at the time of illuminating a part of one pixel 24a of each of the liquid crystal light valves 24R, 24G, and 24B.

In addition, the light incident on the liquid crystal light valves 24R, 24G, and 24B is preferably light obtained by combining line-shaped light, dot-shaped light, a single beam, and multiple beams.

Second Embodiment

Next, a second embodiment of the invention will be described with reference to FIGS. 6 to 10.

In addition, in each embodiment to be described below, parts common to those of the rear projector 1 according to the first embodiment described above are denoted by the same reference numerals, and the descriptions thereof will be omitted.

This embodiment is common to the first embodiment in that a deflection element is used.

That is, although the deflection element is arranged before the liquid crystal light valve in the first embodiment, the second embodiment is different from the first embodiment in that light emitted from liquid crystal light valves 24R, 24G, and 24B is deflected.

Figure 6:
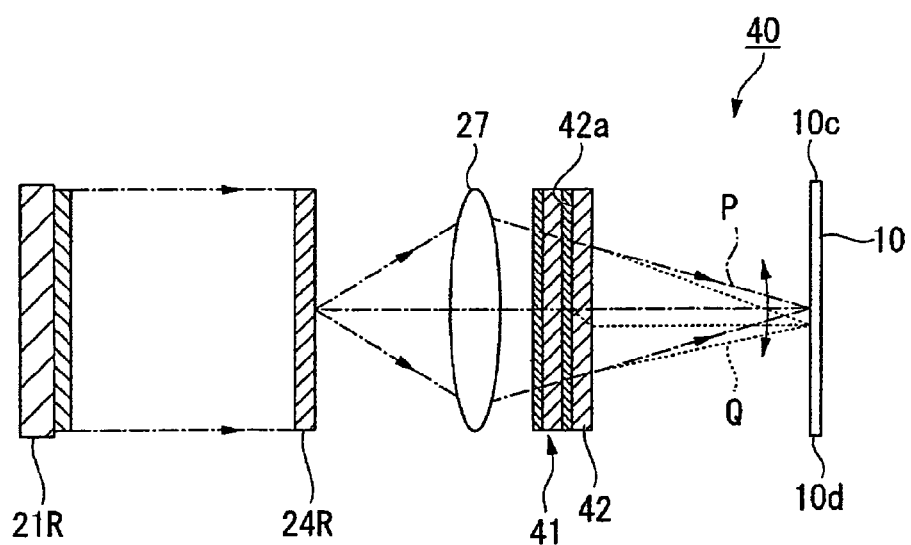
FIG. 6 is a schematic view of a red light section of the projection optical system in an image display apparatus according to a second embodiment of the invention.

As shown in FIG. 6, a rear projector 40 includes a liquid crystal element 41 and a phase plate 42 between a projection lens 27 and a screen 10, the crystal element 41 and the phase plate 42 having the same configuration as in the first embodiment.

That is, when a voltage applied to the liquid crystal element 41 is changed between 0 V and 20 V, the light emitted from the liquid crystal element 41 turns into light having a plane of polarization according to a state of liquid crystal molecules inside the liquid crystal element 11.

Moreover, the phase plate 42 in the present embodiment is disposed by rotating the phase plate 34 in the first embodiment by 90° on the same plane.

Therefore, light projected onto the screen 10 through the liquid crystal element 41 and the phase plate 42 moves from a left side 10c of the screen 10 toward a right side 10d thereof.

In addition, the cross dichroic prism 26 is omitted in FIG. 6.

A pixel 24a of the liquid crystal light valve 24R will now be described.

Figure 7:
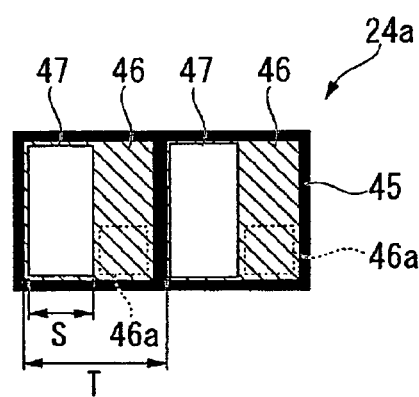
FIG. 7 is a view of a part of a spatial light modulator of the image display apparatus shown in FIG. 6.

In addition, even though the liquid crystal light valve 24R has a plurality of pixels 24a, only two pixels are shown in FIG. 7 for the purpose of simplicity.

The pixel 24a is divided by a light shielding film 45. In about half of each of the divided regions, there is formed a TFT forming region 46 where a thin film transistor (hereinafter, referred to as 'TFT') 46a serving as a pixel switching element, wiring lines, or the like are arranged.

Furthermore, the remaining half of the pixel 24a is a transmissive region (opening region) 47.

Furthermore, in the pixel 24a of the liquid crystal light valve 24R, a size S of the transmissive region 47 is smaller than a pitch T of the pixel 24a.

In addition, since the plane of polarization of light incident on the phase plate 42 changes with time, the light incident on the phase plate 42 is refracted on an incident-side surface 42a of the phase plate 42 at an angle corresponding to the plane of polarization, as shown in FIG. 6.

Accordingly, the light emitted from the phase plate 42 moves on the screen 10 from a state of light P (indicated by one-dotted chain line) to a state of light Q (indicated by broken line).

In addition, the movement of the light emitted from the phase plate 42 shown in FIG. 6 shows deflection in one pixel of the liquid crystal light valve 24R.

Next, a projected region M of the screen 10 illuminated by light emitted from one pixel will now be described.

Figure 8:
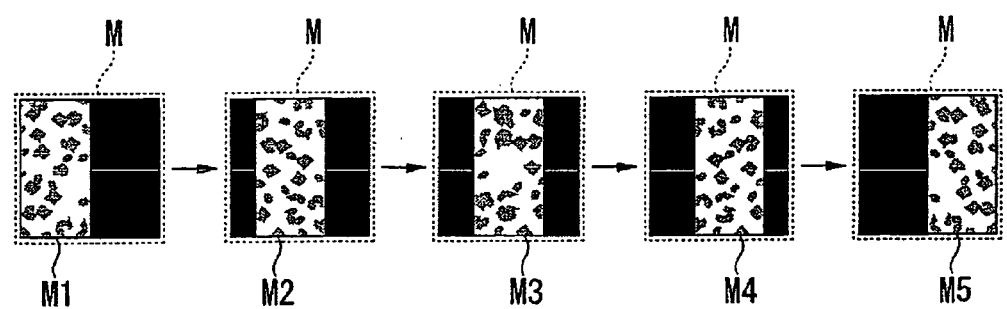
FIG. 8 is a view of the movement of an illumination region of light projected onto a screen shown in FIG. 6.

As shown in FIG. 8, an illumination region M1 illuminated by light projected onto the screen 10 moves in the order of illumination regions M2, M3, M4, and M5 from left to right of the projected region M of the screen 10.

At this time, scattering centers in the illumination regions M1 to M5 of the screen 10 are different for each of the regions M1 to M5.

The pattern drawn in each of the regions M1 to M5 shown in FIG. 8 schematically indicates a speckle pattern. As shown in FIG. 8, the speckle patterns are different for the illumination regions M1 to M5.

In the rear projector 40 according to the second embodiment, the illumination regions M1 to M5 illuminated by the light emitted from the liquid crystal light valves 24R, 24G, and 24B have scattering centers on the screen 10 that are different according to the illumination regions M1 to M5 for movement on the screen 10.

Accordingly, the scattering state of the light emitted from the screen 10 changes variously to move interference fringes that are viewed, such that a pattern of the interference fringes changes in a more complicated manner.

As a result, in the same manner as in the first embodiment, a blurry image occurring due to the scintillation is suppressed. Accordingly, it is possible to obtain effects that an image is satisfactorily viewed.

Moreover, as for the liquid crystal light valves 24R, 24G, and 24B, in a recent trend of increase in resolution, it is generally said that a limit of the pitch T between pixels of the liquid crystal light valves 24R, 24G, and 24B is about 6 μm due to a diffraction loss.

In addition, since an area of a TFT occupying one pixel relatively increases due to increase in resolution, an aperture ratio of the transmissive region 47 decreases up to about 50% as in the second embodiment.

However, in the invention, as the size S of the transmissive region 47 of the pixel 24a of each of the liquid crystal light valves 24R, 24G, and 24B is smaller, the amount of movement of light, which is emitted from each pixel 24a of each of the liquid crystal light valves 24R, 24G, and 24B, from the illumination region M1 to the illumination region M5 can be made larger.

Thus, the scintillation can be even more suppressed.

First Modified Example of the Second Embodiment.

Figure 9:
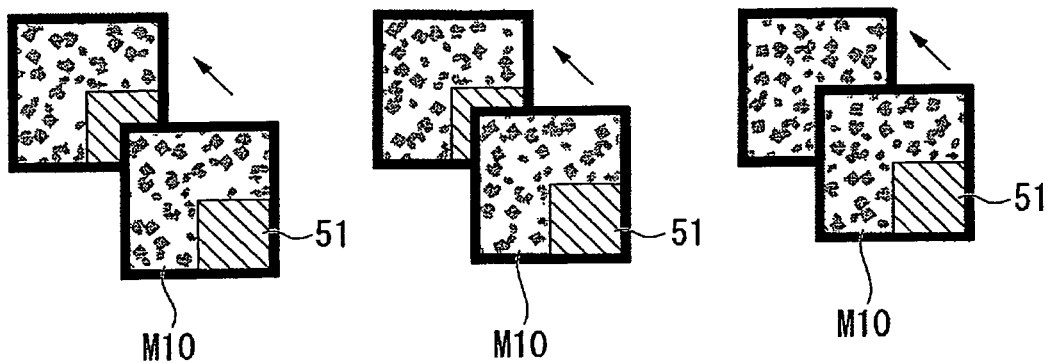
FIG. 9 is a view of a modified example of the image display apparatus according to the second embodiment of the invention.

As shown in FIG. 9, in the case when a TFT 51 of the liquid crystal light valve 24R is formed at a lower right corner, the light emitted from the liquid crystal light valve 24R may be deflected such that an illumination region M10 moves in a diagonal direction.

Second Modified Example of the Second Embodiment

Figure 10A:
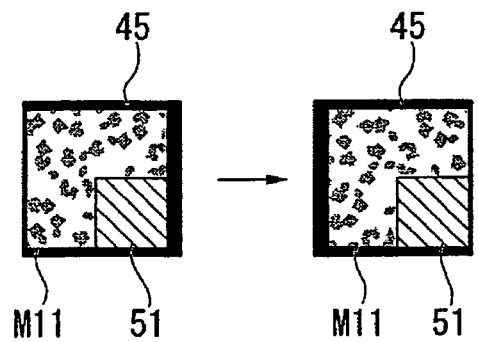
FIGS. 10A and 10B are views of a modified example of the image display apparatus according to the second embodiment of the invention.

As shown in FIG. 10A, as the direction in which an illumination region moves, an illumination region M11 may be moved left and right as much as the light shielding film 45.

Figure 10B:
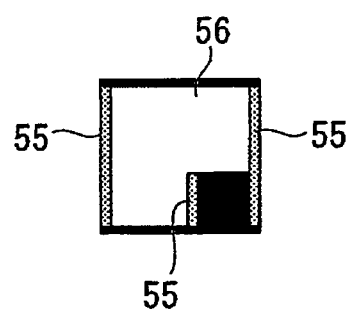

At this time, a transmissive region of one pixel has a shape shown in FIG. 10B.

Accordingly, when the liquid crystal light valve 24R moves, a region 56 of one pixel through which the TFT forming region 46 does not pass is brighter than a region 55 where the illumination regions M11 overlap.

In the first modified example and the second modified example described above, even in a case in which the TFT 51 of the liquid crystal light valve 24R is formed at the lower right corner, the speckle pattern is changed by moving the illumination regions M10 and M11. Accordingly, it is possible to suppress the scintillation in the same manner as the present embodiment.

Third Embodiment

Next, a third embodiment of the invention will be described with reference to FIGS. 11A to 14.

A rear projector 60 according to the third embodiment is the same as that according to the second embodiment in that light emitted from a liquid crystal light valve is deflected, but is different from that according to the second embodiment in that a deflecting section is a movable section 65 having a piezoelectric element.

Figure 11A:
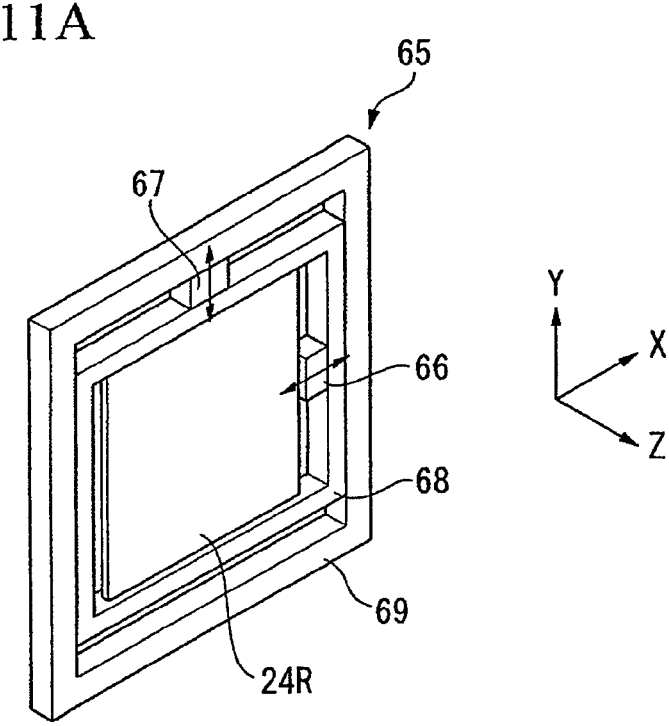
FIG. 11A is a perspective view of a deflecting section of an image display apparatus according to a third embodiment of the invention.

As shown in FIG. 11A, the movable section 65 is provided around the outer periphery of the liquid crystal light valve 24R, and the liquid crystal light valve 24R can move (vibrate) due to the movable section 65.

Next, the configuration of the movable section 65 will be described.

The movable section 65 includes a first piezoelectric element 66, a second piezoelectric element 67, a first slider 68, and a second slider 69.

Figure 11B:
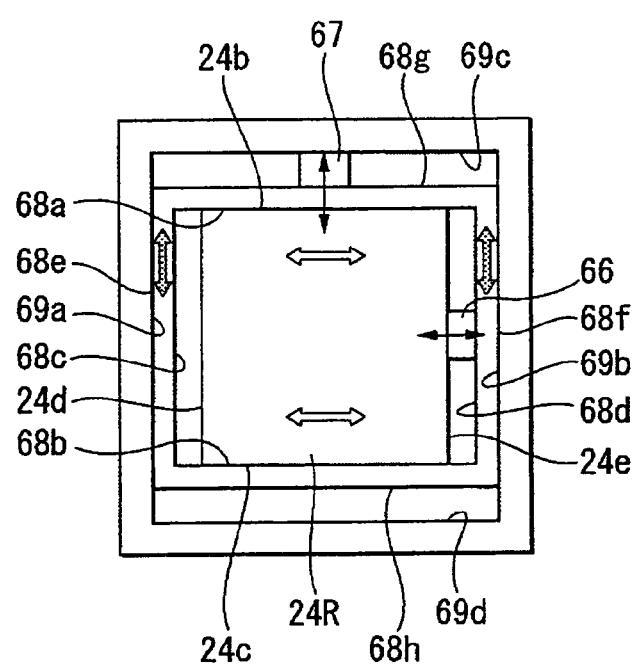
FIG. 11B is a plan view of the deflecting section of the image display apparatus according to the third embodiment of the invention.

As shown in FIG. 11B, the first slider 68 has a frame shape surrounding the liquid crystal light valve 24R. Both internal surfaces 68a and 68b of the first slider 68 extending in the horizontal direction thereof are in contact with both lateral surfaces 24b and 24c of the liquid crystal light valve 24R extending in the horizontal direction thereof.

Furthermore, there are gaps between both lateral surfaces 24d and 24e of the liquid crystal light valve 24R extending in the vertical direction thereof and both internal surfaces 68c and 68d of the first slider 68 extending in the vertical direction thereof, respectively.

In one of the gaps positioned between the lateral surface 24e of the liquid crystal light valve 24R and the internal surface 68d of the first slider 68, the first piezoelectric element 66 is provided in contact with the liquid crystal light valve 24R and the first slider 68.

A second slider 69 has a frame shape surrounding the first slider 68, and both internal surfaces 69a and 69b of the second slider 69 extending in the vertical direction thereof are in contact with both external surfaces 68e and 68f of the first slider 68 extending in the vertical direction thereof.

In addition, there are gaps between both external surfaces 68g and 68h of the first slider 68 extending in the horizontal direction thereof and both internal surfaces 69c and 69d of the second slider 69 extending in the horizontal direction thereof, respectively.

In one of the gaps positioned between the external surface 68g of the first slider 68 and the internal surface 69c of the second slider 69, the first piezoelectric element 67 is provided in contact with the first slider 68 and the second slider 69.

The liquid crystal light valve 24R can slide in the horizontal direction (movement in the x direction) and in the vertical direction (movement in the y direction).

First, the horizontal sliding structure will be described.

Figure 12:
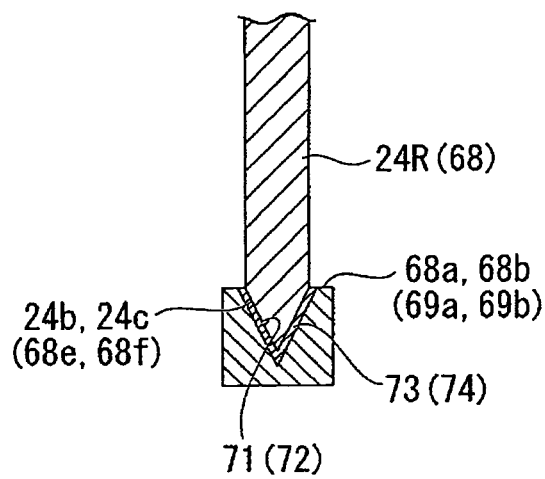
FIG. 12 is a cross-sectional view of a sliding structure of the deflecting section shown in FIGS. 11A and 11B.

As shown in FIG. 12, both the lateral surfaces 68a and 68b of the first slider 68 are formed with V-shaped grooves 71 along the longitudinal direction thereof.

In addition, ends of both the lateral surfaces 24b and 24c of the liquid crystal light valve 24R are inclined surfaces that can slide into the V-shaped groove 71.

Thus, the liquid crystal light valve 24R can slide in the horizontal direction.

Furthermore, the end of the liquid crystal light valve 24R is formed with a contact part 73 having a shape that can be fit into the V-shaped groove 71.

The contact part 73 is formed of a material, such as ceramic, having high abrasion resistance.

Furthermore, a lubricating grease or DLC (diamond-like carbon) film is formed on the surface of the V-shaped groove 71.

Accordingly, even if the liquid crystal light valve 24R slides into the V-shaped groove 71, the end of the liquid crystal light valve 24R is not worn out due to abrasion resistance and low friction.

Next, the vertical sliding structure will be described.

As shown in FIG. 12, the internal surfaces 69a and 69b of the second slider 69 are formed with V-shaped grooves 72, which have the same structure as the horizontal sliding structure and for which surface treatment is performed, along the longitudinal direction thereof.

In addition, ends of both the external surfaces 68e and 68f of the first slider 68 are inclined surfaces that can slide into the V-shaped groove 72.

Moreover, the end of the first slider 68 is formed with a contact part 74 made of the same material as the above contact part 73.

With the configuration described above, the liquid crystal light valve 24R is supported by the first slider 68, and the first slider 68 is supported by the second slider 69.

A piezo actuator is used as the first piezoelectric element 66 and the second piezoelectric element 67.

The piezo actuator is the most suitable since the positioning accuracy thereof is high.

Furthermore, in the piezo actuator, the amount of displacement is in the nanometer range.

Figure 13:
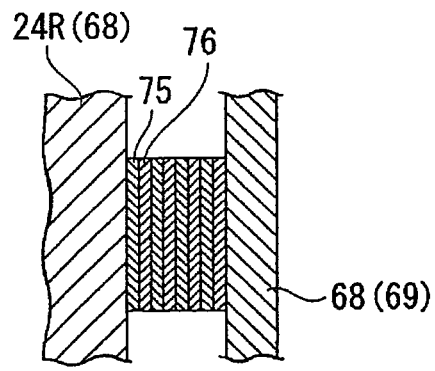
FIG. 13 is a cross-sectional view of a piezoelectric element of the deflecting section shown in FIGS. 11A and 11B.

In addition, as shown in FIG. 13, each of the first and second piezoelectric elements 66 and 67 is formed by alternately laminating a piezo film 75 and an electrode 76 having thin plate shapes.

Thus, it is possible to increase the amount of displacement by laminating the piezo film 75.

Furthermore, the first piezoelectric element 66 and the second piezoelectric element 67 expand and contract when a voltage is applied to the electrode 76.

That is, due to the expansion and contraction of the first piezoelectric element 66 and second piezoelectric element 67, the first piezoelectric element 66 and the second piezoelectric element 67 can move (vibrate) in the horizontal direction (x-axis direction) and the vertical direction (y-axis direction), which are shown in FIG. 11A, but do not move in the focal direction (z-axis direction).

The actual amount of displacement by which the liquid crystal light valve 24R moves is one pixel pitch (about 10 μm in this embodiment) or less.

In the rear projector 60 according to the present embodiment, an illumination region illuminated by the light emitted from each pixel 24a of the liquid crystal light valve 24R moves on the screen 10 by causing the liquid crystal light valve 24R to move using the first piezoelectric element 66 and the second piezoelectric element 67.

That is, since the deflecting section is a piezo actuator, it is possible to suppress sound and vibration from being generated.

Thus, since it is possible to prevent noise from being generated at the time of driving a piezoelectric element, a silent rear projector 60 can be provided.

Furthermore, in the present embodiment, the liquid crystal light valve 24R moves in two axis directions using two piezoelectric elements. Accordingly, speckle patterns of light beams emitted from a screen are much different from one another as compared with a case in which the liquid crystal light valve 24R moves in the one axis direction.

In this case, since various kinds of speckle patterns are integrated and averaged due to the afterimage effect, interference fringes are much less viewed.

In addition, as a fit structure of the liquid crystal light valve 24R and the first slider and a fit structure of the first slider and the second slider, a configuration using a linear bearing may be adopted.

Moreover, even though the first piezoelectric element 66 and the second piezoelectric element 67 have been used as the deflecting section in the present embodiment, a structure supported by only an elastic material may be used.

Furthermore, even though a laminated piezoelectric element has been used as the first piezoelectric element 66 and the second piezoelectric element 67, a single-layered piezo actuator may be used in a case in which it does not matter that the amount of displacement is small.

Figure 14:
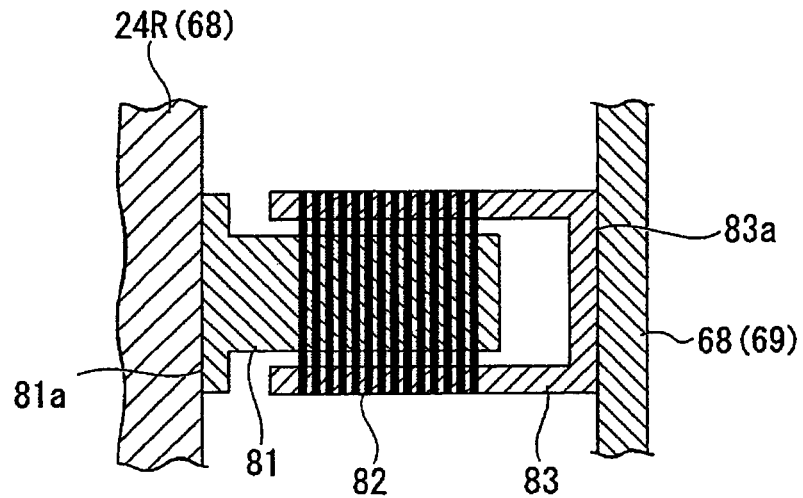
FIG. 14 is a view of a modified example of the image display apparatus according to the third embodiment of the invention.
Figure 15:
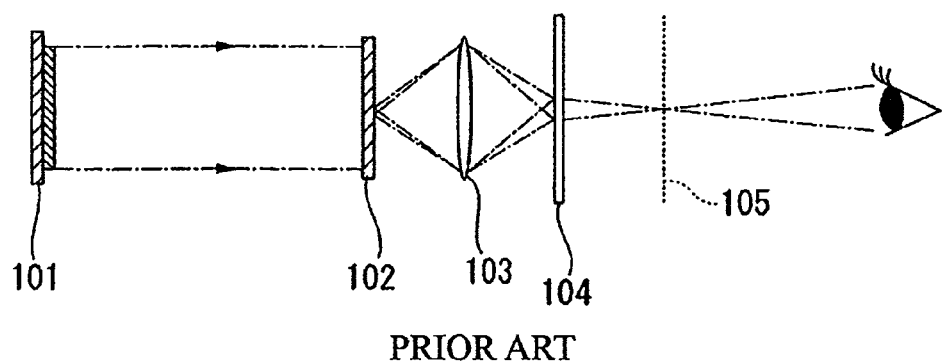
FIG. 15 is a view of a principle of scintillation.

Furthermore, even though the first piezoelectric element 66 and the second piezoelectric element 67 have been used as the deflecting section, an electromagnetic actuator may be used, as shown in FIG. 14.

The electromagnetic actuator is a solenoid configured to include the magnet 81 and the coil 82, a voice coil motor (VCM), or a linear motor.

Specifically, the electromagnetic actuator includes the coil 82 formed in a fixing part 83 and the magnet 81 that vibrates by an electromagnetic force.

Furthermore, the liquid crystal light valve 24R or the first slider 68 is fixed to an end surface 81a of the magnet 81.

The first slider 68 or the second slider 69 is fixed to an end surface 83a of the fixing part 83.

In the configuration described above, the magnet 81 makes a linear movement by supplying a current to the coil 82. Accordingly, the liquid crystal light valve 24R and the first slider 68 can move in the same manner as in the present embodiment.

In addition, the technical scope of the invention is not limited to the above embodiments, but various modifications may be made without departing from the spirit and scope of the invention.

For example, a front projection type projector (image display apparatus) may be used, even though the rear projection type projector (rear projector) has been explained as an example in the embodiments described above.

In addition, a reflective liquid crystal light valve and a minute mirror array device may also be used as a spatial light modulator, even though an example in which the transmissive liquid crystal light valve is used as a spatial light modulator has been described.

In this case, the configuration of a projection optical system may be appropriately changed.

What is claimed is:

1. An image display apparatus comprising:
a light source emitting light;
a condensing section condensing the light emitted from the light source, and including a plurality of curved surfaces;
a deflecting section deflecting the light that is emitted from the light source;
a spatial light modulator having a display region, the spatial light modulator receiving the light deflected by the deflecting section and modulating the light deflected by the section in accordance with an image signal; and
a projection device projecting the light modulated by the spatial light modulator onto a projection surface including an illumination region, wherein
the light emitted from the light source is condensed as a plurality of line-shaped beams through the condensing section, the plurality of line-shaped beams illuminate a part of the display region of the spatial light modulator, the light is deflected by the deflecting section, and the illumination region illuminated by the light moves on the projection surface.

2. The image display apparatus according to claim 1, wherein
the deflecting section includes:
a liquid crystal element that rotates a plane of polarization; and
an optical member having a birefringence property.

3. The image display apparatus according to claim 1, wherein
the deflecting section is a hologram element.

4. The image display apparatus according to claim 1, wherein
the light which is incident on the spatial light modulator is a plurality of beams.

5. An image display apparatus comprising:
a light source emitting light;
a spatial light modulator having a plurality of pixels, and modulating the light emitted from the light source in accordance with an image signal;
a projection device projecting the light modulated by the spatial light modulator onto a projection surface including an illumination region; and
a deflecting section deflecting the light emitted from the spatial light modulator, wherein
a size of an opening region of each pixel of the spatial light modulator is smaller than a pitch of the pixels, the light emitted from the spatial light modulator is deflected by the deflecting section, the illumination region illuminated by light emitted from each pixel of the spatial light modulator is continuously moving in one pixel within a range smaller than a pixel pitch of the spatial light modulator.

6. The image display apparatus according to claim 5, wherein the deflecting section includes:

a liquid crystal element that rotates a plane of polarization; and an optical member having a birefringence property.

7. The image display apparatus according to claim 5, wherein the deflecting section is a piezoelectric element that allows the spatial light modulator to move.

8. The image display apparatus according to claim 6, wherein the plane of polarization is temporally changed, and light incident on the deflecting section is refracted on an incident-side surface of the deflecting section at an angle corresponding to the plane of polarization.

* * * * *